No. 792,767. PATENTED JUNE 20, 1905.
W. F. ELLIS & E. C. DAVIS.
TIRE CONSTRUCTION.
APPLICATION FILED AUG. 9, 1904.

No. 792,767.

Patented June 20, 1905.

UNITED STATES PATENT OFFICE.

WILLIAM FREDERICK ELLIS, OF STAMFORD, CONNECTICUT, AND EDWIN CURTIS DAVIS, OF NEW BRUNSWICK, NEW JERSEY, ASSIGNORS TO THE UNIVERSAL TIRE COMPANY, OF NEW YORK, N. Y., A CORPORATION OF MAINE.

TIRE CONSTRUCTION.

SPECIFICATION forming part of Letters Patent No. 792,767, dated June 20, 1905.

Application filed August 9, 1904. Serial No. 220,076.

*To all whom it may concern:*

Be it known that we, WILLIAM FREDERICK ELLIS, a resident of Stamford, in the county of Fairfield and State of Connecticut, and ED-WIN CURTIS DAVIS, a resident of New Brunswick, in the county of Middlesex and State of New Jersey, citizens of the United States of America, have invented a new and useful Tire Construction, of which the following is a specification.

Our invention relates to improvements in tire constructions for vehicle-wheels; and it consists of certain peculiar means for adapting the tire covered by United States Letters Patent No. 688,399, issued to us December 10, 1901, to a wooden felly, and of certain other features, all as hereinafter set forth; and the objects of our invention are, primarily, to provide practicable and efficient means for attaching the tire described and claimed in the above-mentioned Letters Patent to a wooden wheel instead of a wire wheel, and, secondarily, to afford improved means for uniting the flaps of the tread and the cover of the rim, if there be such a cover, with the rim. This construction enables us to place our tire on an old wheel as well as a new one, which is an advantage. We attain these objects by the means illustrated in the accompanying drawings, in which—

Figure 1:
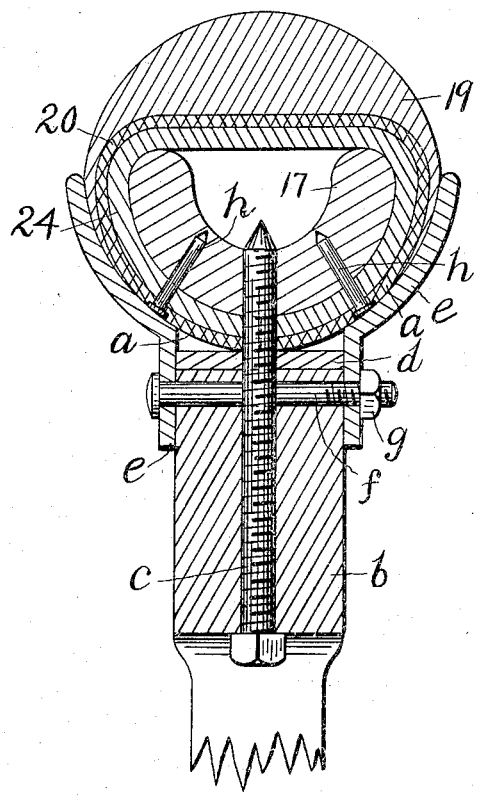
Figure 2:
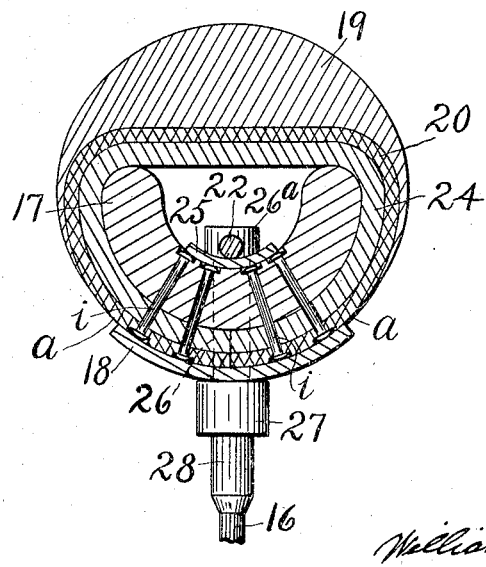

Figure 1 is a cross-section of a wooden felly and our tire mounted thereon and united therewith, the same being an embodiment of the new construction; and Fig. 2, a cross-section of the tire as adapted for a wire wheel, showing the means by which the tread-flaps are secured to the rim, such means being only slightly different from that which appears in the first view.
Similar figures and letters refer to similar parts throughout the several views.

The channeled rim 17 and the tire proper or tread 19, having an inside lining 20, the sides of which embrace said rim, as shown at $a\ a$, are practically the same as similar members in the aforesaid patent. So, also, is the cover 24, which may or may not be used, and the spoke 16, shield 18, socket-head $26^a$, collar 27, and sleeve 28, the last six members appearing in Fig. 2. The tread may be made of rubber with a fabric lining, or it may be differently constructed. The cover consists, preferably, of leather; but some other material may be substituted for leather if found expedient to do so.

Referring now to Fig. 1, it will be observed that the rim 17, with the other elements of this particular form of tire, is mounted on the felly $b$ and there held in place by means of a screw $c$ passing radially through said felly and rim, an ordinary steel tire or other metallic hoop $d$ being interposed between the periphery of the felly and the flaps $a$, which are wrapped about the rim. The hoop $d$ may be omitted, if desired. Other screws, similar to $c$, are inserted at intervals around the felly between the spokes. Nuts and bolts may of course be substituted for these screws. In place of the single shield 18 we here use a double shield in the form of two annular members $e$, each of which has a segmental part and a straight part in cross-section, the straight part extending onto the adjacent side of the felly $b$. The segmental portions of the members $e$ extend outward against adjacent portions of the flaps $a$ and serve to protect the same, while the straight portions of said members are held firmly against the sides of the felly $b$ by means of the required number of bolts and nuts, one each of which appears at $f$ and $g$. The bolt $f$ passes through the felly $b$ and the straight portions of the members $e$, and the latter are firmly clamped to the former between the head of said bolt and the nut $g$. Of course, screws, one on each side, may be substituted for each bolt $f$ and nut $g$.

From the foregoing it will be seen that the tire is held to the felly by the radial screws and securely supported laterally by the double shield members $e$. This construction is strong and serviceable, at the same time being simple, and allows the cushion-tire to be conveniently united with an old wheel without even removing the flat steel tire thereon.

The rim 17 when made of wood, as is generally the case, affords the opportunity of utilizing nails $h$, as shown in Fig. 1, or rivets $i$, as shown in Fig. 2, for the purpose of fastening the flaps $a$ and sides of the cover 24 to said rim by simply driving such nails through the flaps and cover into the rim, on the one hand, and making suitable holes through these parts for the reception of such rivets, on the other hand, the latter, of course, being "headed over" in the usual manner after being inserted in the holes prepared for them. The nails $h$ and rivets $i$ force the flexible members tightly against the rim and firmly hold them in place. Screws might be used for this purpose, and either rivets or screws would be applicable if the rim were of metal instead of wood. Preferably the nails or rivets are so arranged that their heads are covered by the members $e$ and the shield 18, and such an arrangement, especially when nails are used, prevents the same from working out. In the absence of the cover the same devices may be employed to fasten the tread-flaps alone to the rim. The nails and rivets may be used interchangeably in the two tires shown.

In Fig. 2 an annular part 25 encircles the bottom of the channel in the rim 17 and covers the ends of the rivets $i$, such part being held in place by a continuous wire 22, which passes through each head $26^a$ outside of said part. The part 25 takes the place of the washers 25 and the wire 22 of the band 22 in the former patent.

What we claim as our invention, and desire to secure by Letters Patent, is—

The combination, in tire construction, with a channeled rim, of a yielding tread mounted thereon and having flaps embracing the same, nails or the like inserted in said rim after passing through said flaps, and a metallic support or shield for the flaps and rim over the heads of said nails.

In testimony whereof we have signed our names to this specification in the presence of two subscribing witnesses.

WILLIAM FREDERICK ELLIS.
EDWIN CURTIS DAVIS.

Witnesses:
   Jos. V. Dooley,
   B. B. Sterling.